March 15, 1949.  A. VANDERVELD  2,464,470
STORE FURNITURE Filed Sept. 24, 1945  9 Sheets-Sheet 1

Inventor
Anthony Vanderveld
By Liverance & Van Antwerp
Attorneys

March 15, 1949. A. VANDERVELD 2,464,470
STORE FURNITURE
Filed Sept. 24, 1945 9 Sheets-Sheet 2

Inventor
Anthony Vanderveld
By Liverance and
Van Antwerp
Attorneys

March 15, 1949. A. VANDERVELD 2,464,470
STORE FURNITURE
Filed Sept. 24, 1945 9 Sheets-Sheet 3

Inventor
Anthony Vanderveld
By Liverance and
Van Antwerp
Attorneys

March 15, 1949. A. VANDERVELD 2,464,470
STORE FURNITURE
Filed Sept. 24, 1945. 9 Sheets-Sheet 6

Inventor
Anthony Vanderveld
By Liverance and
Van Antwerp
Attorneys

March 15, 1949.  A. VANDERVELD  2,464,470
STORE FURNITURE
Filed Sept. 24, 1945  9 Sheets-Sheet 7

Inventor
Anthony Vanderveld
By Liverance and Van Antwerp
Attorneys

Inventor
Anthony Vanderveld
By Liverance and
Van Antwerp
Attorneys

Patented Mar. 15, 1949

2,464,470

UNITED STATES PATENT OFFICE 2,464,470

STORE FURNITURE

Anthony Vanderveld, Grand Rapids, Mich., assignor to Grand Rapids Store Equipment Company, Grand Rapids, Mich., a corporation of Michigan Application September 24, 1945, Serial No. 618,103

21 Claims. (Cl. 312—108)

The present invention relates to store furniture.

In the merchandising of many and different articles sold in stores, and particularly in department stores, a foundation case or cabinet having top, bottom, back and vertical ends and carried upon a base which rests on the floor, open at its front side, is and has been used, the space within being susceptible by means of various attachments and accessories usable therewith, to be made capable of receiving drawers when needed, doors at the front, suspending rods upon which garments are hung, the mounting of horizontal partitions to divide the space into superimposed compartments and with individual doors at the front of each compartment, and many other arrangements for the best holding and display of the articles to be sold. Such cases or cabinets in general have been produced at the factory with the base, back, top, bottom and ends permanently connected together requiring shipment to the place of use in space consuming assembled form.

Furthermore, the modern trend in store designing, and particularly in department stores, departs markedly from the prior conventional methods of installing and locating such cases or cabinets on the floor where they are to be used. Heretofore it has been substantially a universal practice to locate said cases or cabinets against the wall or in alinement with each other. Modern store design departs from such old and conventional practice requiring the cases or cabinets in many instances to be disposed at angles to each other and as an example, a series of such cases or cabinets which previously would be located against the wall in straight alinement may now take substantially the form of a curve, each cabinet being at an angle to the adjacent cabinets at the ends thereof. Such departure from previous practice has necessitated the building of special store furniture to fit into and conform with the floor plan of location of the furniture as designed and planned for use, with a resultant greatly increased expense for furniture equipment in a store.

The present invention is directed to a very novel, useful and practical structure which may be produced to standard designs in large quantity and, therefore, with a greater economy in production, in which the foundation case or cabinet is made of separable parts which are shipped to their places of use separate from each other with an occupancy of relatively little space, each case or cabinet when assembled and in use in the store being like every other, and each being fitted and equipped for the application of many and different kinds of accessories to be used therewith to equip any case or cabinet for particular articles of merchandise to be displayed and sold; and with a ready and easy rearrangement and changing of such accessories at different seasons of the year so that seasonable merchandise may always be best displayed without requiring alteration or change in position of the installed furniture. And furthermore, the structure which has been designed is adaptable without change for either location of any desired number of the foundation cases or cabinets in alinement with each other, or any or all of them may be disposed at any desired angle to the others next adjacent.

To these ends the invention has been made, a practical embodiment of which will be understood from the following description taken in connection with the accompanying drawings, in which.

Like reference characters refer to like parts in the different figures of the drawings.

In the construction of the furniture for each of the cabinet units a base is provided having a horizontal top 1 which provides a bottom for the cabinet space and which is located above spaced parallel front and back frame member 2, and end members 3 connecting the ends of the front and rear frame members 2. As shown in Fig. 7, the top member 1 of the base does not extend to the rear edge of the rear frame member 2 and at the back side of the frame member 2 a thin longitudinal strip 4 is connected which extends above the rear frame member 2 to which it is secured and above the upper side of the part 1, thereby providing a longitudinal groove which is used, as hereinafter described, to receive the lower edge of the back of the cabinet. At each end 3 of the base two attaching members in the form of flat metal plates 5 are secured, each having an offset longitudinal vertical lip 6, the front plate at its front and the rear plate at its rear portion. Said plates are located toward the front and rear sides of the frame but a short distance therewithin (Fig. 6).

Figures 1, 2, 3:
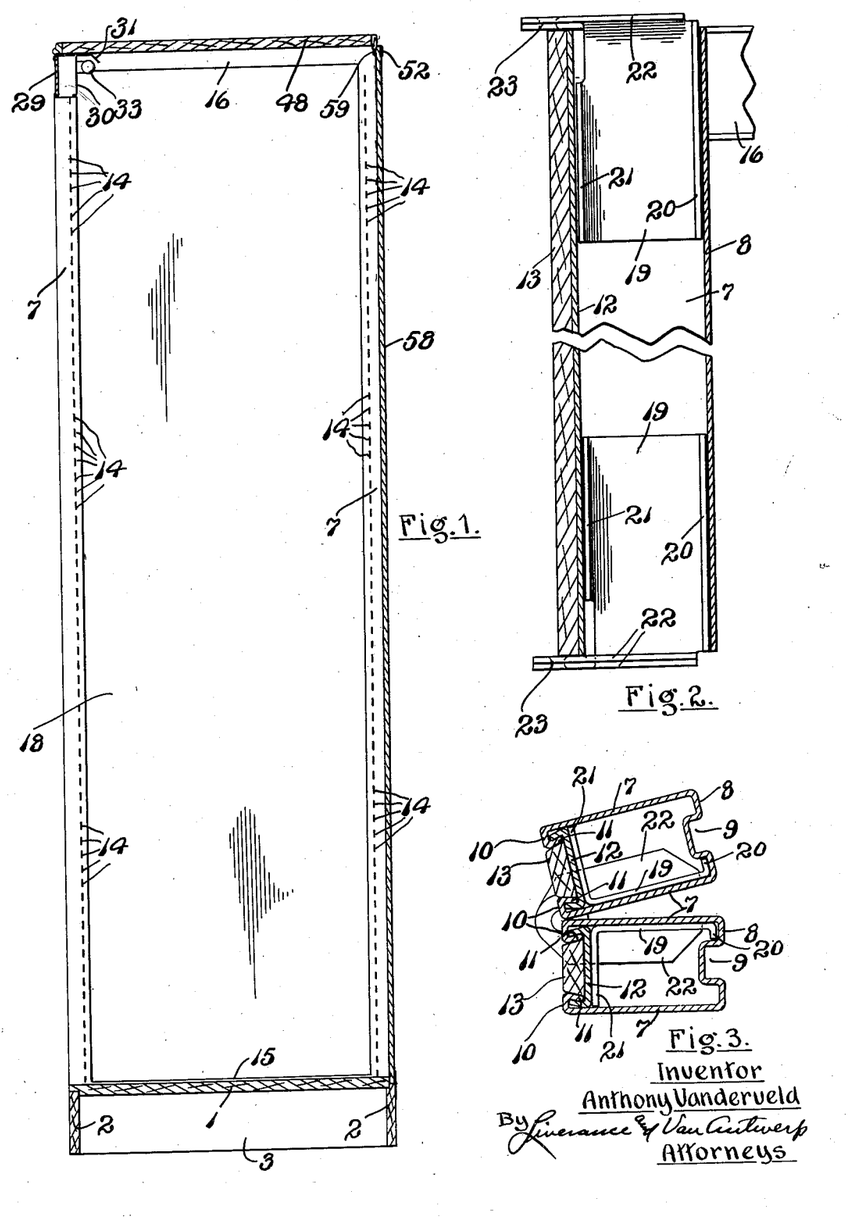
Fig. 1 is a vertical section from front to rear of one of the basic or foundation cases or cabinets as it is preferably made in accordance with my invention.
Fig. 2 is a fragmentary vertical section at one end and at the front of one of said cabinets illustrative of the hinge means used for connecting two adjacent cabinets or cases, and by means of which they may be disposed at desired angles to each other.
Fig. 3 is a horizontal section at the front and at adjacent ends of two adjacent front corner posts of cabinets thus hingedly connected together.

Detachable vertical end frames are detachably connectible with said plates 5. In the structure of said frames, front and rear vertical ports are provided each being made from a single length of sheet metal and formed (Fig. 3) as hollow posts with two spaced sides 7, integrally connected by a transverse web portion 8 which, substantially midway between the sides 7, is pressed inwardly to provide a vertical groove 9 extending the length of post. The free edges of the sides 7 are turned inwardly toward each other for short distances, as indicated at 10, and then turned through an angle greater than a right angle providing terminal flanges 11 which diverge from each other away from the opening or space between them. The two angularly disposed flanges 11 have associated therewith a channel member 12 made from flat metal, the flanges of which incline and converge toward each other, so that when such channel member 12 is slid into position lengthwise of the post its flanges interlock with the flanges 11 as shown in Fig. 3. This leaves an open relatively wide groove which, in those posts which are at the front of the cabinet structure, are provided with an elongated finishing strip 13 which may be of wood, plastic or other suitable material suitably stained, colored, or decorated, and which is shaped to conform to the diverging flanges 11, being held and retained in place when slid lengthwise therebetween. Each side 7 of each post throughout its length has a plurality of spaced vertical slots 14 cut therethrough for the attachment and support of shelf brackets, door holding frames or fixtures and many other detachable and interchangeable accessories usable with the furniture structure described.

Figure 6:
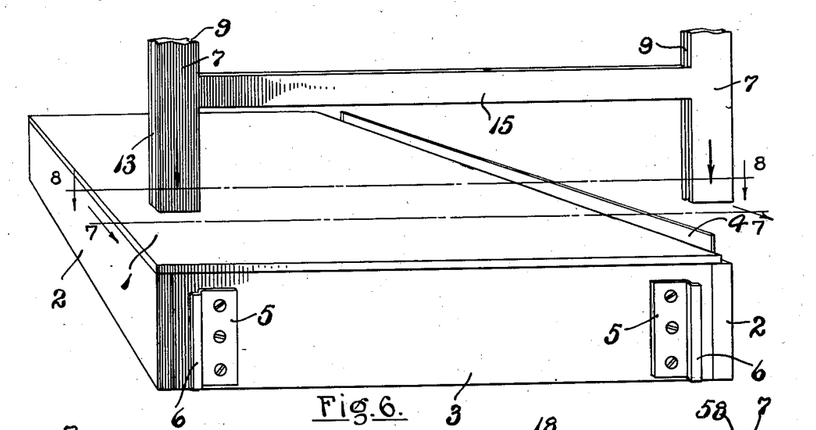
Fig. 6 is a perspective view of the base of the cabinet with a fragmentary portion of a vertical end frame, detachably connectable at each end of the base.
Figure 7:
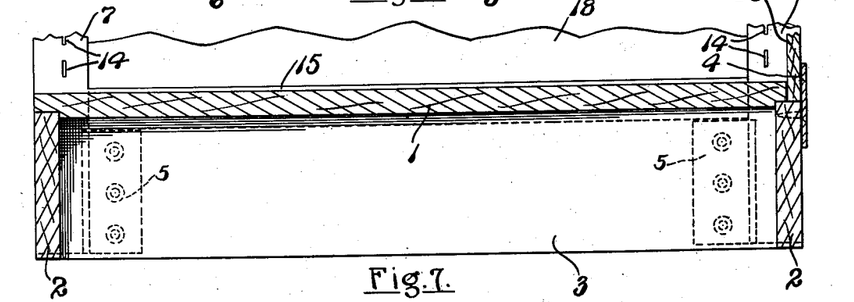
Fig. 7 is a vertical transverse section through the base, a fragmentary portion of an end being shown in elevation extending thereabove, the plane of the section in the completed furniture being substantially as indicated by the line 7—7 of Fig. 6.
Figure 8:
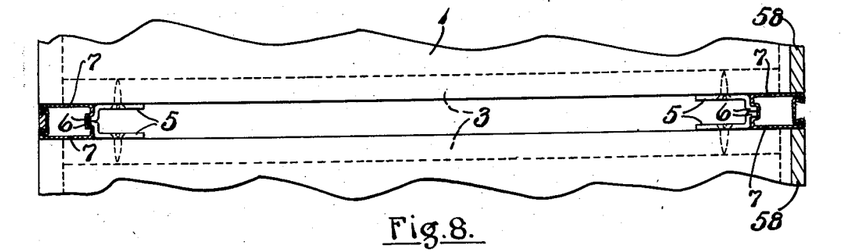
Fig. 8 is a fragmentary partial horizontal section and plan illustrating the connecting of an end frame to the adjacent ends of two bases where the cabinet structures are to be secured in alinement with each other, the plane of the section being substantially on the line 8—8 of Fig. 6, said sections in Figs. 7 and 8 being taken looking in the directions indicated by the arrows.
Figure 9:
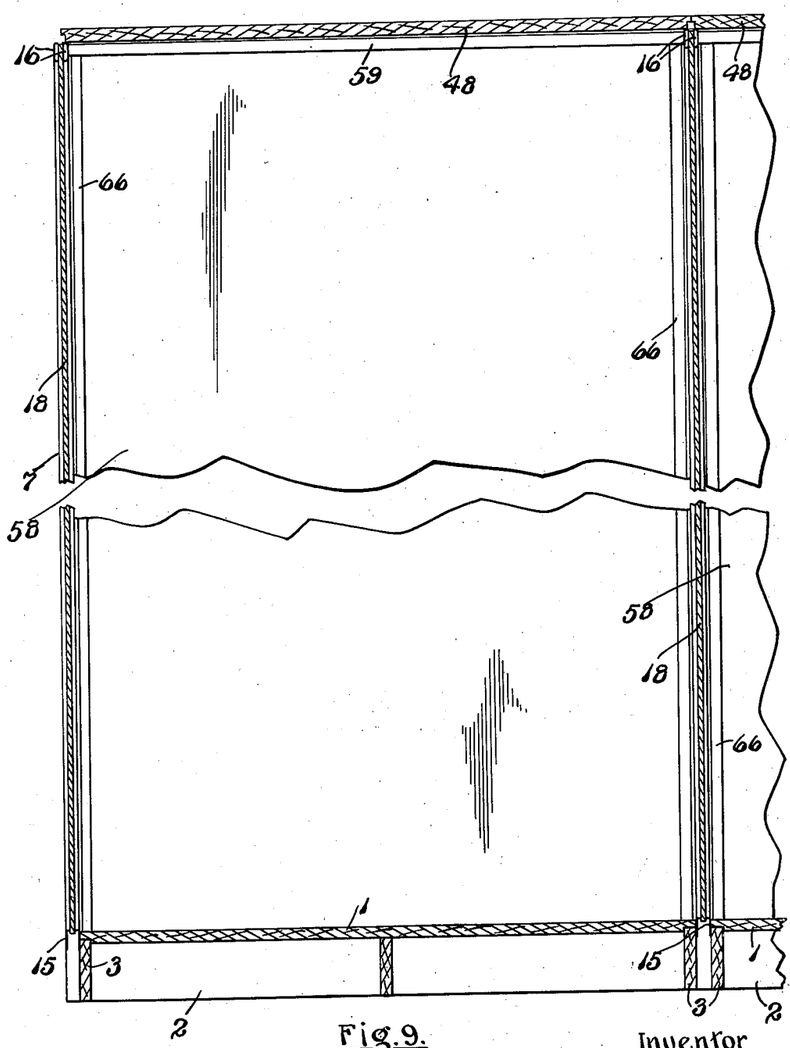
Fig. 9 is a fragmentary longitudinal vertical section through two connected cabinets or cases in assembled relation to each other.
Figure 14:
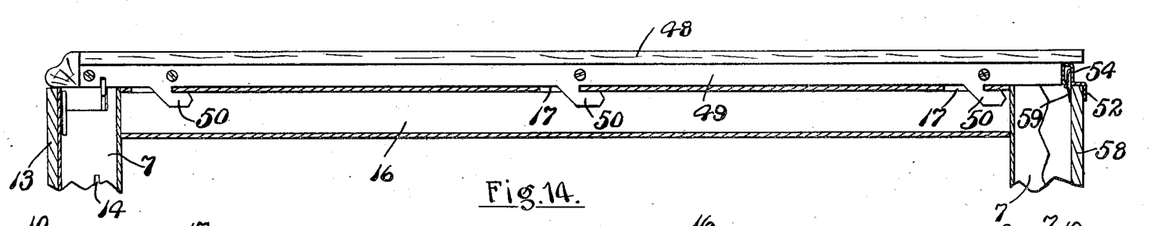
Fig. 14 is a fragmentary vertical section from front to rear at the upper end of the cabinet and at one end thereof illustrating the means used for connecting the top in place.
Figure 15:
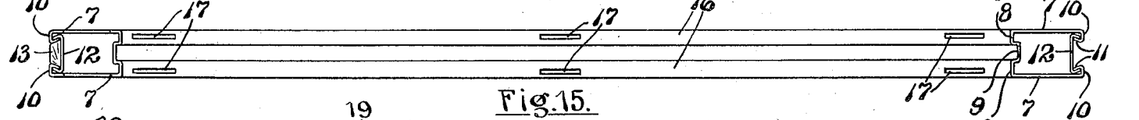
Fig. 15 is a plan view of the vertical frame used in the cabinet structure.
Figure 16:
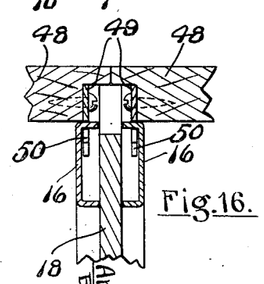
Fig. 16 is a fragmentary transverse vertical section at the adjacent ends of two tops of two adjacent merchandise receiving cabinet structures in which, when located in alinement, a single end frame and parts associated therewith is used for two adjacent cabinets.

The front and rear posts are substantially identical in construction but are reversed in position so that the front posts have the groove 9 at their rear sides and the rear posts such grooves at their front sides (Figs. 6 and 8.) The two posts of an end frame are connected adjacent but a short distance above their lower ends by a horizontal cross bar 15 which (Fig. 9) may be of channel form with downwardly extending flanges connected by an upper web which upper web has a groove similar to the groove 9 pressed downwardly therein. At their upper ends (Figs. 14, 15 and 16) the posts are connected by two spaced channels 16 as shown, the upper flanges of which have spaced longitudinal slots 17 cut therethrough as best shown in Fig. 15. The ends of the members 15 and 16 are welded to the vertical posts providing a strong and durable structure.

Figure 28:
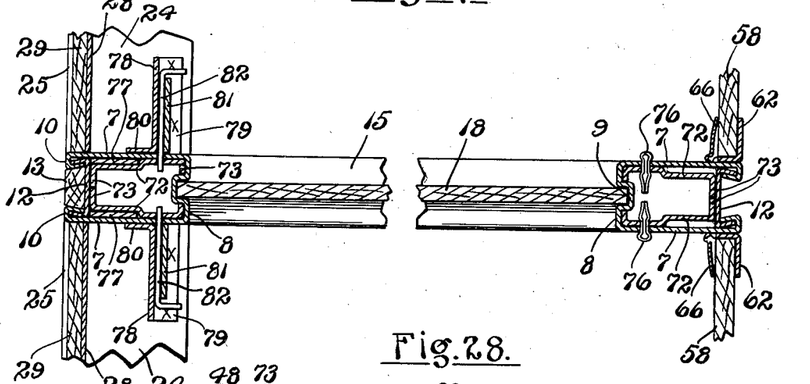
Fig. 28 is a horizontal section substantially on the plane of line 28—28 of Fig. 27.
Figure 29:
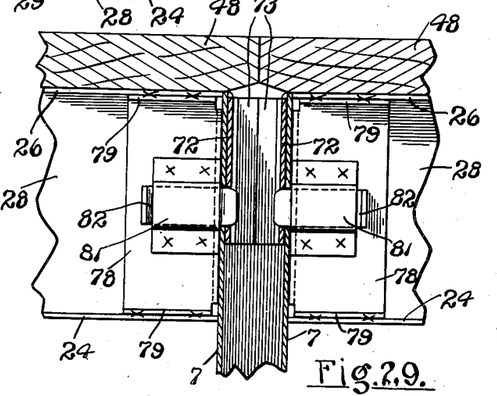
Fig. 29 is a fragmentary longitudinal vertical section a short distance back of the front where two cabinets are located in alinement with a common end frame between them, illustrating the locking means for holding the cornice against tilting movement.
Figure 30:
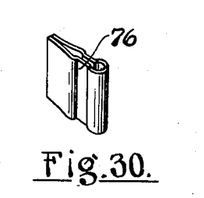
Fig. 30 is a perspective view of a removable locking clip used in connection with the rear post for securing the top in place.

The end frames thus constructed are adapted to receive an end panel 18 which is slid into place by insertion between the two upper channels 16 being guided and retained at its front and rear edges in the grooves of the posts and received at its bottom edge in the groove in the upper side of the lower cross member 15 (Figs. 7 and 28).

Figures 4, 5:
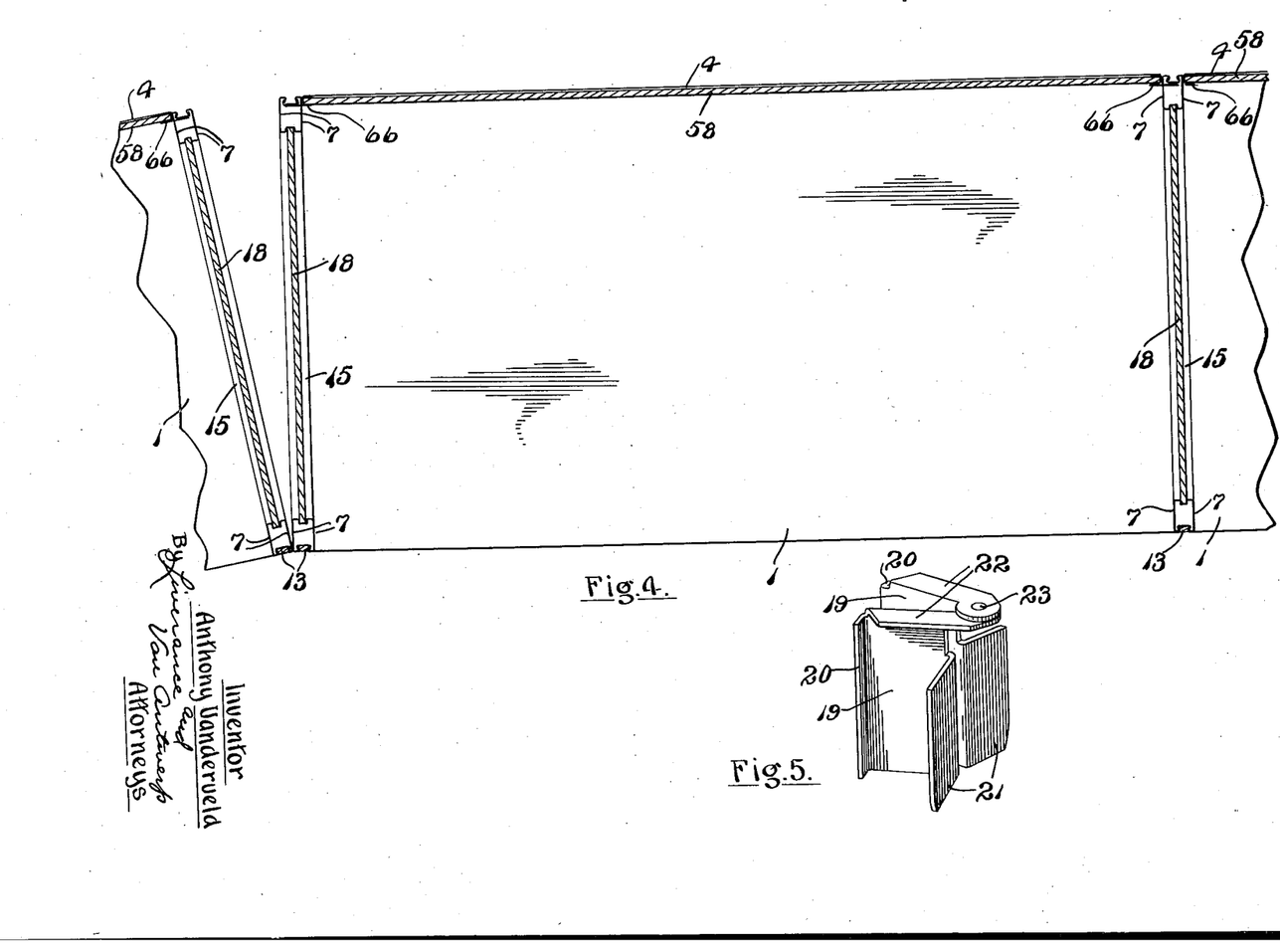
Fig. 4 is a fragmentary horizontal section through a series of such assembled cases or cabinets, two of them connected in alinement and with a hinge connection, as mentioned, of one of the cabinets to the one adjacent.
Fig. 5 is a perspective view of the hinge structure used at both upper and lower ends of the cabinet structure.

In the assembly of the frames with the base the lower ends of the front and rear posts of the frame are forced downwardly into connection with the plates 5 and their offset lips 6 (Fig. 8). If two or more of the cabinet structures are to be located in alinement, two of the bases (Fig. 8) are located with adjacent ends spaced a distance apart and with the offset lip portions 6 on the adjacent ends of the bases in contact with each other. Then by engaging the lower end portions of the posts 7 therewith and moving the frame of which said posts form a part downwardly the two lips 6 at the front are received in the groove 9 at the rear side of the front post and those at the back are received in the groove at the front side of the rear post. If, however, a cabinet structure is to be assembled by itself and not in such described conjunction with another adjacent thereto at one end, the end frames are connected in exactly the same way, only the lips 6 of the plates 5 on the single base used entering the grooves 9. In either event the frames are securely held in connection with the base or bases with which they are associated and connected. As shown in Fig. 4, the cabinet, at the right hand end, is connected in alinement with a second cabinet with a single vertical frame carrying the end panel 18 between the two bases, one of such frames with said panel 18 providing a vertical separating partition between the cabinet spaces of the two cabinets; and as both sides 7 of the front and rear posts are provided with the accessory fixture receiving slots 14, the merchandise receiving carrying and displaying space may be arranged for any desired service and at times, when a rearrangement is desired, such rearrangement is quickly and readily performed without disassembly or moving of the cabinet structures.

Frequently, in accordance with modern store furniture designing, a cabinet structure is to be located at an angle to the one next adjacent and not in alinement therewith, as shown at the left in Fig. 4. In such case the cabinet structures are each provided with an end consisting of the end frame described with the panel 18 therein. Two of such cabinet structures may be disposed at any desired angle with respect to each other. The two front posts of the end frames are brought close together and are hingedly connected at both their upper and lower ends by means of readily applied and readily detached and removable hinges. The same structure may be used with back posts as well, to hinge two cabinets for a reverse angular positioning.

In Figs. 5, 2, and 3 such hinges and their manner of application and use are shown. The hinges consist each of two leaves 19 made of sheet metal, each having flanges 20 and 21 bent therefrom at its vertical edges, the flange 20 being of less width than the flange 21. Each of said leaves 19 at one end is provided with a third horizontal flange 22 which flanges 22 are extended beyond the leaves 19 and overlap and are pivotally connected together at 23. Said hinges are applied to the post 7 by inserting one in the lower end of the hollow post and one in the upper end thereof the upper and lower hinges being reversed in position. The flanges 21 described bear against the channel members 12 previously described and the narrow flanges 20 seat in the groove provided by inwardly pressing the side 8 of the post in forming its panel receiving groove 9. Each of the posts receives one of the hinge leaves. The pivotal axes of the two pivots 23 are in vertical alinement. Accordingly when two of the front posts of the end frames of the cabinet structure are thus hingedly connected, they may be swung relatively to each other to occupy any selected angle, and will not accidentally or otherwise separate at their ends at the front.

Figure 17:
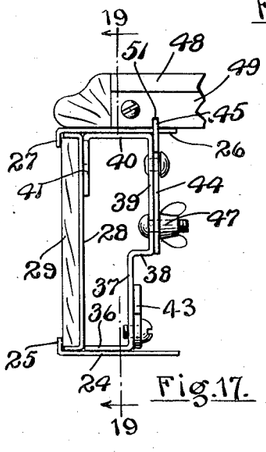
Fig. 17 is a fragmentary end elevation of the front upper cornice illustrating the means for locking the top used therewith against any forward movement of the top.

The upper ends of the front posts of the spaced frames are connected by a horizontally disposed cornice. Such cornice includes a lower horizontal plate 24, having an upturned lip 25 at its front edge (Fig. 17), and an upper horizontally disposed plate 26 with a downturned lip or flange 27 at its front edge, the two flanges 25 and 27 being in the same vertical plane. A channel 28 having a vertical web is located between the plates 24 and 26 and has forwardly extending flanges which are welded or otherwise permanently secured to said plates 24 and 36. A bar 29 of wood, plastic or other suitable material may be slid lengthwise between the back or web of the channel 28 and the flanges 25 and 27. The length of the plates 24, 26 and of the channel 28 is substantially equal to the horizontal distance between the upper ends of the vertical frame posts.

Such cornice preferably is utilized to support and have detachably connected therewith a lighting structure. Included in the lighting structure is a vertical plate 30 at its upper end bent horizontally to the rear and terminating in a downwardly and inwardly inclined reflector portion 31. Brackets 32 for carrying a light source 33, for example, an elongated fluorescent tube are connected to the plate 30. Such plate at its lower end has an inturned horizontal flange adapted to lie over and against the upper side of the lower cornice plate 24 in which position the upper cornice plate 26 and the rear horizontal extension to the plate 30 will be located in the same horizontal plane.

Spaced brackets 34 shown as substantially of U-form (Fig. 10) are secured at the front side of the plate 30, their free legs being adapted to be inserted under and held by leaf spring clips 35 fastened to the rear side of the cornice plate 28. Such lighting unit may be readily attached or removed by means of the structure described, as is evident.

Figure 18:
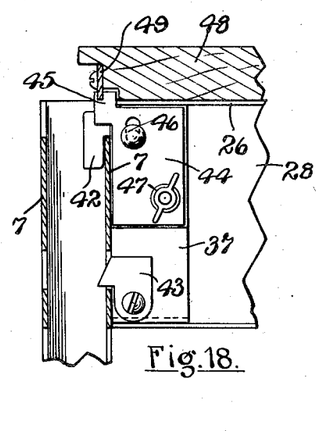
Fig. 18 is a fragmentary rear elevation of the end of said front upper cornice as it appears looking at the structure shown in Fig. 17 from the right.
Figure 19:
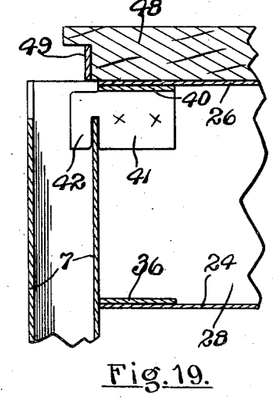
Fig. 19 is a fragmentary longitudinal vertical section at one end of the cabinet structure, the plane of the section being substantially on the line indicated at 19—19 of Fig. 17.

At each end of the cornice, means are provided for detachably connecting and securing it at the upper ends of the front frame posts. A fixture made from a length of flat metal is made having a lower horizontal flange 36 from which a section extends vertically as at 37, for a distance; is then bent at 38 to extend horizontally at the rear for a short distance (Fig. 17), thereafter extended vertically as at 39, and turned to provide a forwardly extending horizontal section 40 terminating in a downturned section 41 which at its upper portion and outer edge is extended at one end as at 42 with a vertical slot (Fig. 19) between the parts 41 and 42. Said slot extends from the lower edge of said parts for a distance but short of their upper edge. The bracket 32 rests upon and may be permanently secured to plate 24, the section 40 comes underneath and may be permanently secured to the upper cornice plate 26 and the terminal section 41 is against the rear side of the cornice channel member 28 and spot welded or otherwise secured thereto. The hooks provided by the projecting portions 42 and the slots between them and the integral sections 41 are adapted to hook over the sides 7 of the front posts of the described frame, which sides 7 at their upper ends (Fig. 18) have portions removed so that when the cornice is in place, the upper side of the upper plate 26 is flush with the upper end of its associated post (Fig. 19).

On the section 37 a retaining dog 43 is pivotally mounted which, after the cornice has been put in place, is turned to the position shown (Fig. 18), the dog passing through a slot therefor in the side 7 of the adjacent post. This releasably retains the cornice against upward movement. Preferably the dog will be mounted upon a screw as shown, threaded through the section 37, which screw may be tightened after the dog is in retaining position.

At the rear side of the vertical section 39 a plate 44 is mounted which, at its upper outer corner, has an offset and upwardly extending projection 45. The plate is mounted for a limited vertical movement by means of the rivet and slot shown at 46 (Fig. 18) and may be secured in place by a screw and thumb nut 47, the screw likewise passing through a similar slot in the plate 48. Thus the plate may be raised and lowered to bring it into locking or unlocking relation with the top, about to be described.

The top 48 which covers a cabinet space, at each end is under cut (Figs. 11 and 14) to provide an overhanging end beneath which a bar 49, extending nearly the full width of the top, is permanently secured. At its lower side spaced downwardly and rearwardly extending tongues or hooks 50 are formed which are adapted to pass through the slots 17 in the flanges of the channel 16, the top then being moved to the rear to the position shown in Fig. 14. In this position a vertical slot 51 adjacent the forward end of the bar 49 is brought into alinement with the projection 45 on plate 44, and said plate 44 having been in a lower position, is raised to upper position for the projection 45 to enter the slot 51, locking the top against forward movement while the hooks 50 secure it against upward movement.

Figures 11, 12, 13:
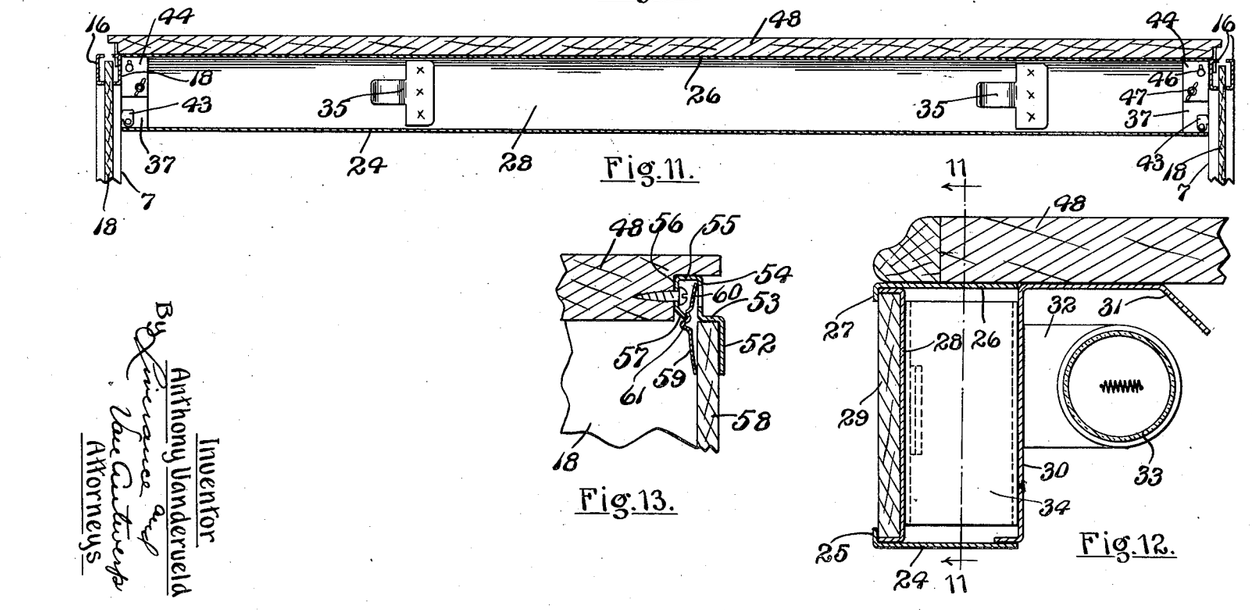
Fig. 11 is a longitudinal vertical section substantially on the plane of line 11—11 of Fig. 12 in the direction indicated.
Fig. 12 is a fragmentary vertical transverse section showing the front cornice location with respect to the top.
Fig. 13 is a fragmentary vertical section at the rear edge of the top and the upper edge of the back of the cabinet showing the means used for detachably connecting them together.

The top is also under cut at its rear edge and a longitudinal metal member is secured thereto (Fig. 13). Said metal member has a downwardly extending terminal vertical flange 52 which is continued in a short horizontal forward section 53, thence in a second vertical section 54 from the upper edge of which a web 55 is bent forwardly for a short distance, thence downwardly in a flange 56 parallel to the section 54. The flange 56 terminates in a rearwardly and downwardly inclined lip 57. The structure described is permanently secured at the rear edges of the top 48 by means of screws as shown in Fig. 13.

The back 58 is a rectangular relatively thin panel, the lower edge of which is received between the rear edge of the top 1 of the base and the back strip 4 previously described (Fig. 7). The upper edge portion is located in front of the depending section 52 the upper edge of the back coming underneath the horizontal section 53 (Fig. 13). At its upper edge, the back is secured in place by a thin metal longitudinal strip 59 which extends substantially the full width of the back, and from which an upper section 60 disposed at an obtuse angle to the strip 59 passes back of the lip 57 and bears against the section 54, there being longitudinal ribs and grooves as indicated at 61 formed between the parts 59 and 60. The free edge of the longitudinal lip 57 seats in the groove between the ribs and holds the metal retaining strip described in place with the strip bearing with a yielding spring pressure against the front side of the back 58.

Figures 20, 21, 22:
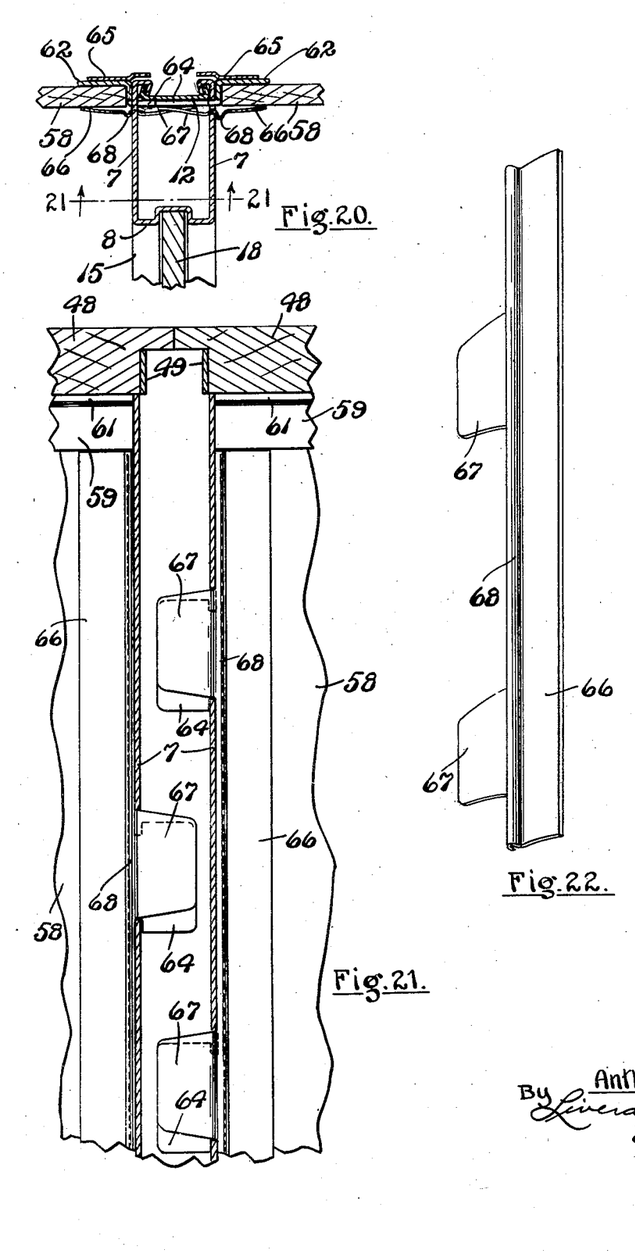
Fig. 20 is a fragmentary horizontal section at the adjacent ends and at the rear of two of the cabinet structures in alinement, showing the manner in which the backs are releasably secured in place.
Fig. 21 is a fragmentary vertical section substantially on the plane of line 21—21 of Fig. 20, looking in the direction indicated.
Figs. 22 and 23 are perspective views of the vertical retaining strips used at the vertical edges of the backs to detachably secure them in place.
Figure 23:
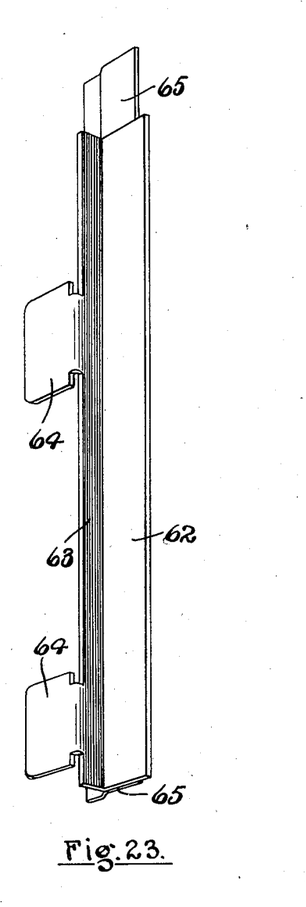
Figure 24:
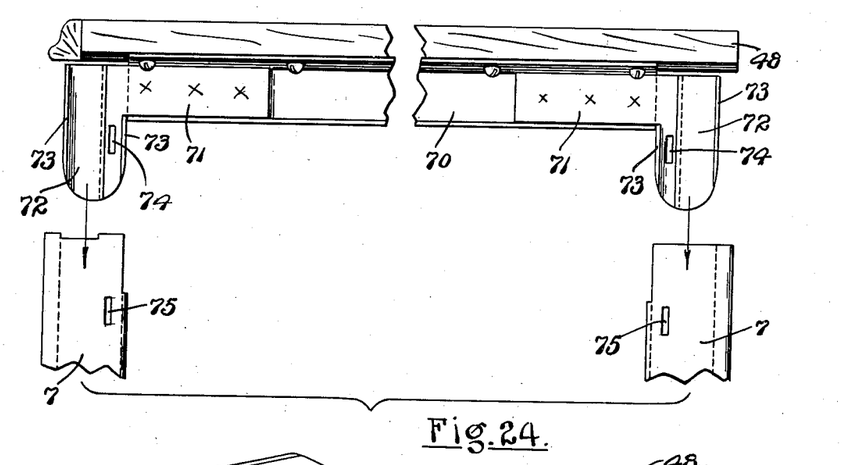
Fig. 24 is an end elevation of a different form of top and connecting means therefor, producing a more simple and economical structure.

At the vertical sides of the back, prior to the placing of the back in place, a vertical member of metal (Fig. 23) is connected at the inner side of each of the rear posts. Said vertical metal member is of angular form with two flanges 62 and 63 disposed substantially at right angles to each other. From the free edges of the flange 63 tongues 64 of the form and shape shown are bent. At the rear side of the flange 62 a thin elongated metal strip 65 is permanently secured. The sides 7 of the rear posts at their back portions have vertical slots through which the tongues 64 pass (Fig. 20), the projecting free edge portions of the strip 65 lying back of the adjacent rear side of the post. It will be noted that the tongues 64 are wider at their outer portions than at the places where connected with the flange 63 providing notches so that when put in place and moved downwardly an interlock is made between them and the post to which secured. The back 58 having been put in place after the vertical supports consisting of the angle bars having flanges 62 and 63 have been installed, the supper retaining strip 59 is then installed and the assembly is completed by attaching, at each vertical side of the back 58 a second elongated thin metallic strip 66, from which tongues 67 extend at one edge to pass through the same slots that the tongues 64 are passed, and as in Figs. 20 and 22, a similar releasable retaining groove 68 is formed like the ribs and grooves shown at 61 for holding the side retaining members against disconnection to bear with a yielding spring pressure against the front side of the back 58 at each vertical edge portion.

In Figs. 24 to 30 inclusive, a simplified and more economical structure is shown. In such structure the upper cross channels 16 of the end frames are eliminated, and to strengthen the lower cross member 15, an under closure channel 69 is welded in place (Fig. 26) making in effect a seamless tube with much greater strength against damage which might occur from twisting.

Figure 25:
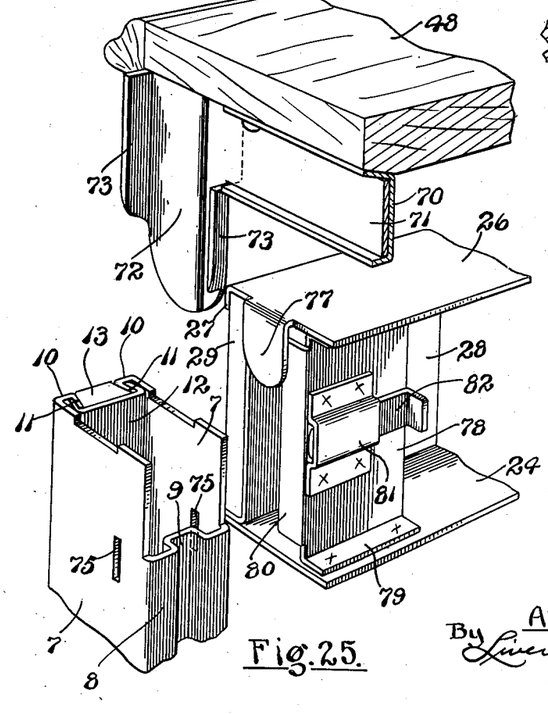
Fig. 25 is a fragmentary enlarged perspective view, illustrating the upper end of a post, the end of the cornice detachably connecting therewith and the adjacent end of the top detachably connected with the post.
Figure 26:
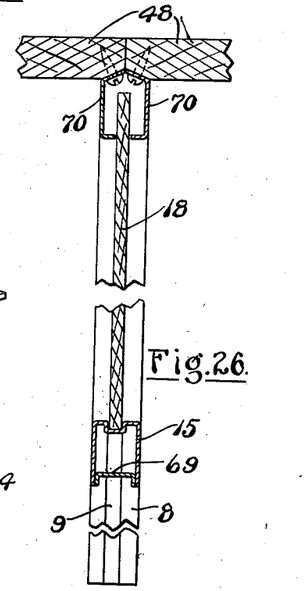
Fig. 26 is a fragmentary vertical longitudinal section through the structure where one intermediate frame is used between two cabinets.
Figure 27:
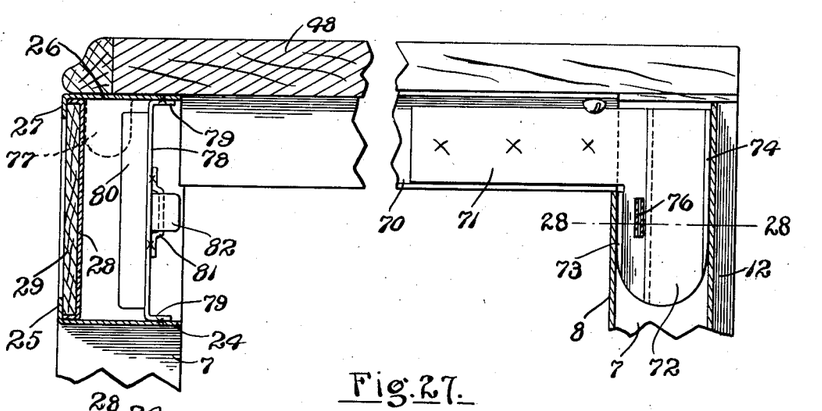
Fig. 27 is a fragmentary transverse section from front to rear at the upper part of a cabinet unit.

At the under side and at each end of each top 48, a channel 70 is secured, the ends of which terminate a short distance back of the front end of the top and in front of the rear edge thereof. At the end of each channel an angle bracket is located and permanently secured, having a horizontal arm 71 spot welded to the web of the channel and at its end, beyond the adjacent end of the channel, having a downwardly extending vertical arm 72 which at its vertical edges is provided with flanges 73 (Fig. 25). The rear side of the front vertical post of each end frame and the front side of the rear vertical post is cut away a short distance as shown in Fig. 25. With this structure the top is installed in place by inserting the downwardly extending arms 72, one at each corner of the top 48, into the upper ends of the hollow posts, the flanges 73 (Fig. 28), fitting into the grooves of the posts and against each other so that the top is held against endwise or forward and rearward movements.

The arms 72 (Fig. 24) are provided each with a slot 74 as shown. The sides of the posts have cooperating slots 75 therein. Said slots 74 and 75 come into direct conjunction with each other when the top is installed in place. Releasable retaining clips 76 (Fig. 30) are passed through the alined slots 74 and 75 to securely connect the top at its rear corners with the rear posts as shown in Fig. 28. The members 76 are made of resilient material and are shaped to be snapped in place, being yieldingly held against accidental disconnection, but readily removed when such removal is wanted.

The front horizontal cornice is modified slightly in structure, the upper plate member 26 (Fig. 27) at each end having an integral downturned ear 77 which hooks over the adjacent side 7 of the end frame post, the upper edges of said sides 7 being recessed, best shown in Fig. 25, a depth equal to the thickness of the metal so that the upper side of the plate 26 is flush with the upper ends of the posts 7. The arms 72, previously described, are offset sufficiently (Fig. 28) so that when the top has been applied the tongues 77 are received between the front portions 72 and the inner sides of the sides 7 of the front posts.

At each end of the cornice at its rear side a support of metal, including a vertical web 78 and horizontal end flanges 79 thereon is mounted, the flanges being spot welded to the inner sides of the plates 24 and 26. The plate 78 also has a flange 80 at one vertical edge for strength and reinforcement. At the rear side of the web 78 a horizontal stirrup guide 81 is permanently secured and between it and the rear side of the web 78 a slidable slightly bent or cambered locking bar 82 is mounted. Said locking bars, one at each end of the cornice, when said cornice is installed in place, may pass at their ends through slots 75 in the sides 7 of the adjacent posts and through the slots 74 made in the arms 72. By this construction the top is secured in place at each front corner against any upward movement, and the cornice is held against any tilting movement about a longitudinal axis.

Figure 10:
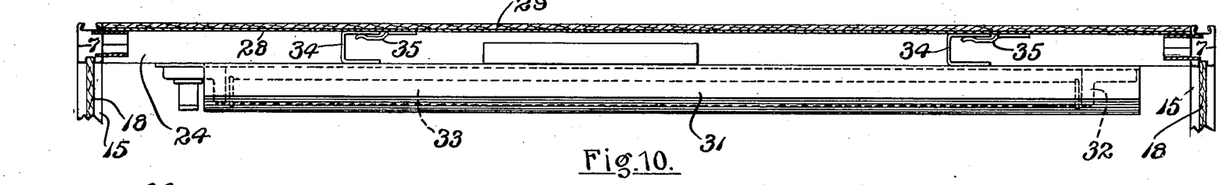
Fig. 10 is a horizontal section longitudinally of and at the upper horizontal cornice of the cabinet, the lighting means therefor being shown in plan.

With this construction the cornice may have mounted thereon the same lighting structure previously described, and shown in Figs. 10 to 12 inclusive. The last described construction is simpler and less costly in the means used for connecting the top in place. The channels 70 also maintain the top against warping and eliminate the necessity of attaching a separate bar for such purpose at the upper side of each end of the top, which in practice is required (not shown) in the first described top structure.

The store furniture construction described is especially practical and useful. A single cabinet may be produced, having ends, top, bottom and back; a plurality of the cabinets connected in direct alinement with each other may also be produced, the entire assembly having ends, and at intermediate spaced places having a common end between each of two cabinet spaces; and either the individual cabinets or a series of them connected together may be connected with other individual cabinets or other series and disposed at any selected angle with respect to each other, all without variation in the parts manufactured and without the necessity of any special equipment except the simple easily attached hinges which are used at the upper and lower ends of the front posts of two cabinets which are to be located at an angle to each other.

The assembly is done wholly from the front, permitting the bases to be initially located where they are to stay, inserting and connecting the end and dividing frames supplied with the panels 18 slid thereinto, applying the front cornices and the top from the front, and securing the backs in place. The furniture produced may be installed directly against a wall or other backing. There is no requirement for getting to the backs of the cabinets or of the assembled furniture at any time during the installation. The disassembly is quite as easy, should it be desired at any time to move the store furniture to a different floor or a different part of a floor, and substantially no tools of any kind are required in performing the assembly or disassembly. The only tool at any time which may be used is a screw driver in tightening or loosening the screw for the dog 37.

In each and every one of the cabinet spaces provided, whether in a complete single unit or in a plurality of alined units, or whether a whole or part of the cabinets are located at various angles to each other, the equipment of the interior space with various fixtures, attachments and accessories for accommodating the space to receive and display selected articles or merchandise is subject only to such selection as the merchant desires; and each cabinet space may be rearranged and changed for different types of merchandise and for the various accessories which best hold and display it without any disassembly of the furniture beyond the readily attachable and removable accessories and fixtures which are used.

Another feature of value in connection with the store furniture is that its shipment from the factory to its place of use is with a minimum of shipping space required. All parts of the structure are interchangeable and there is no damage at any disassembly and moving thereof. At any sale of the store and its furnishings the store furniture of the present invention remains a valuable asset and is salable and removable without loss from damage in disassembly and reassembly for use in another or other stores.

The store furniture described is likewise economical to produce. All of these features of value and others not specifically stated combine to make the invention one of very great utility greatly advancing the art of store furnishings.

The invention is defined in the appended claims and is to be considered comprehensive of all forms of structure coming within their scope.

I claim:

1. In furniture construction, a base having spaced vertical ends, spaced front and rear attaching members secured at each end of the base, and end frames having spaced front and rear vertical posts and a horizontal member connecting the posts, said end frames being insertable in a downward direction one at each end of the base, said attaching members and the inner sides of said posts having interengaging means for releasably securing the posts through said attaching members to the base.

2. In a construction as described, a base having spaced apart vertical ends, two attaching members secured to each end of the base one adjacent the front and one adjacent the back thereof, each attaching member comprising a plate having an outwardly extending offset lip at a vertical edge portion thereof, said offset lips on the attaching members at each end of the base extending to the front in the front attaching member and to the rear in the rear member, respectively, and an end frame detachably connected at each end of said base, said end frame comprising spaced vertical front and rear posts and a horizontal cross member connecting said posts, the front posts of the end frames at their rear sides and the rear posts at their front sides having vertical grooves therein, and said posts being spaced from each other so that they may be moved downwardly with the offset projecting portions of said base attaching members received in said grooves.

3. A construction as defined in claim 2, the vertical posts of said end frames being of metal and having opposite spaced sides integrally connected in the front post at its rear and in the rear post at its front, said rear and front parts of the front and rear posts respectively having said vertical groove formed therein, and means connecting the rear sides of rear posts and means connecting the front sides of the front posts, said posts being hollow and open at their upper and lower ends.

4. In a construction as described, a base having a top, front and rear, vertical sides and vertical ends, a second base located in alinement with the first base and spaced therefrom at the adjacent ends of the bases, two attaching members secured at the adjacent ends of the bases, each comprising a plate to lie against the end of the base and having an offset lip at a vertical edge thereof, said attaching members being located one near the front of each base and the other near the rear of each base, the front attaching members having said offset lips extending in a forward direction and in the rear attaching members extending in a rearward direction, the rear attaching members on the adjacent bases having their respective lips positioned side by side, and a vertical frame having front and rear posts and a cross member connecting the posts in spaced relation to each other, said front post being provided with a groove in its rear side and the rear post with a groove in its front side of a width to receive and embrace said adjacent offset lips of the attaching members at the front and rear positions of said bases.

5. In a structure as described, a base having vertical ends, end frames connected to and at the outer sides of the ends of said base, each of said end frames including hollow vertical front and rear posts spaced from each other, a transverse member permanently connecting the posts of an end frame in spaced relation to each other, a detachable top extending over and between the upper ends of said end frames, and means insertable in the upper and lower ends of the front post for hingedly connecting said front post to the front post of a like structure positioned at an end thereof.

6. In a furniture construction as described, two cabinet units each comprising a base, spaced vertical ends extending upwardly from the base, a top and a back, said ends each comprising a frame having front and rear spaced connected vertical posts, the posts of said end frames being open at their upper and lower ends, said units being located at an acute angle to each other with the front posts of the end frames at adjacent ends of the units located closely adjacent to each other, and hinges detachably inserted in the upper and lower ends of the adjacent front posts, said hinges comprising two pivotally connected hinge members, the upper hinge connected at the upper ends of the adjacent posts having one hinge member of each insertable downwardly into each post, and the lower hinge having one hinge member thereof insertable into the lower end of each post, the pivotal axes of the two hinges being in substantially vertical alinement.

7. In a furniture construction as described, a base having spaced vertical ends, attaching members secured at each end of the base at the outer side thereof, one adjacent the front end and one adjacent the back of each end of the base, and end frames each comprising two vertical spaced front and rear posts, the front post having a longitudinal groove in its rear side and the rear post a like groove in its front side, a horizontal cross member connecting said posts a short distance above their lower ends, the upper side of said cross member having a longitudinal groove therein, a panel slidably inserted between the posts having its vertical edge portions received in the grooves thereof and the lower edge portion received in the groove of said cross member, said attaching means at the ends of the base having offset portions entering the grooves in said front and rear posts below the horizontal cross member of the frame when said end frame is applied to the base from above it and moved downwardly.

8. In a furniture construction, a base having a horizontal top, a vertical front and back, and spaced vertical ends, end frames each comprising a front and rear post connected together in parallel spaced relation detachably connected at each end of the base and extending upwardly therefrom, an end panel located between the front and rear posts, means at the back of the front post and at the front of the rear post for receiving and holding the vertical edges of said panel, a horizontal cornice member extending between the front posts of said end frames at the front thereof, said front posts at their upper ends being open, hooks at the ends of the cornice member to hook over the upper end portions of said front posts and enter the open upper ends thereof, and a movably mounted holding means mounted at each end of the cornice movable into and out of engagement with the adjacent post, said posts having side openings to receive the holding means.

9. In a construction as described, a base having spaced vertical ends, vertical end frames, each having spaced front and rear posts and a lower horizontal frame member connecting said posts, detachably connected to and extending above each end of the base, a cornice extending horizontally between the upper ends of the front posts, means for detachably connecting the cornice at its ends to said front posts, a top extending over and between the upper ends of said end frames, means carried by said top for detachably securing it in place and holding the top from upward and rearward movement, releasable means mounted at each end of the cornice for holding it against movement, a back between the rear parts of the base and top detachably connected with said base and top at its upper and lower edge portions, and removable means connected with the rear posts for connecting the vertical edge portions of said back to the posts, said removable means being removable and replaceable from the front.

10. In a construction as described, a base, vertical ends extending upwardly from the base and detachably secured thereto, a top located above and extending between said ends, means for detachably securing the top in place, means providing a longitudinal groove at the rear edge of the base for receiving the lower edge of a back panel, a longitudinal member secured to the top at its rear edge and extending downwardly against which an upper edge portion of a back is adapted to be located, front and rear corner posts connected to each end of the base, vertical longitudinal backing members detachably secured one at the inner side of each post, a back panel disposed in said lower groove and against said longitudinal member on the top and the vertical edge portion of said vertical backing members on the rear posts, and longitudinal retaining members detachably connected with said posts and extending vertically at the front of the back, whereby said back is releasably held in place and may be removed or replaced from the front.

11. A construction as defined in claim 10, said rear posts being hollow lengthwise thereof and having slots in their sides adjacent their rear portions, and said vertical retaining members comprising thin metallic strips having a plurality of spaced tongues extending from one edge and passing through said slots, said strips and tongues being disposed at an angle to each other so as to be distorted from such angle when the tongues are passed through said slot, the strips thereby bearing against the front vertical edge portions of said back with a yielding pressure.

12. A construction as defined in claim 10, said rear posts having spaced vertical slots therein adjacent their rear sides and said vertical backing members comprising elongated strips of metal of angular form having two legs located at right angles to each other, one leg lying against a post and being of a width substantially equal to the thickness of the back panel, and said leg having extending from the free edge thereof laterally spaced tongues to pass through said slots, said retaining members bearing against the back at the vertical edge portions thereof comprising elongated strips having spaced tongues extending at one edge therefrom, also passing through said slots in the posts.

13. In a construction as described, a plurality of cabinet units each having a horizontal base, a horizontal top, vertical ends and a vertical back, means for detachably connecting the ends to the base, means for detachably connecting the top to the vertical ends at their upper ends, means for detachably connecting the back in place from the front, vertical front posts and means for hingedly connecting front posts of adjacent units with the axes of the hinges in substantially parallelism to the lengths of the posts.

14. In a structure as described, a base having vertical ends, posts one adjacent each corner of the base and at the ends thereof, means for detachably connecting said posts with the base, said posts being open at their upper ends, a horizontal cornice extending between the upper end portions of the front posts, hook means at each end of the cornice hooking over said posts and entering the open ends thereof for securing the cornice between the posts, a horizontal top, means for detachably securing the top in place at the upper ends of and in fixed relation to said posts, and means for releasably connecting said cornice at its ends to said posts to prevent movement of the cornice about a longitudinal axis.

15. In a furniture construction of the class described, a base having spaced vertical ends, spaced front and rear attaching members secured at each end of the base, front and rear vertical posts detachably connected with said attaching members at each end of the base, a horizontal top, means located on the under side of the top for connecting said top with the posts at the upper ends thereof, said means being releasable for disconnection of said top, end panels between the front and rear posts at each end of the base, means on said posts for receiving the vertical end panels and holding them in place, a horizontal cornice located underneath the front edge portion of said top, and means for detachably connecting the cornice to said posts at their upper ends.

16. In a construction as described, a base having a horizontal top and vertical ends, hollow vertical posts secured one adjacent the front and the other adjacent the rear at each end of said base, a horizontal top, angle brackets secured at the under side and one at each corner of the top having downwardly extending arms insertable in the upper ends of the posts, and removable retaining means passing through the inner sides of said posts and said arms to detachably connect the arms with the posts.

17. A construction as defined in claim 16, said front posts having each a vertical groove in its rear side, and each rear post a like groove in its front side, and end panels located between the front and rear posts at each end of the base having their vertical edge portions received in said grooves.

18. In a furniture construction as described, two cabinet units, each comprising a base, vertical corner posts extending upwardly and detachably connected at the lower ends to the ends of said base, a top and a back, said front posts being open at their upper and lower ends, said units being adapted to be positioned at an acute angle to each other with the front posts at adjacent ends in close proximity and hinges detachably connected with said mentioned front corner posts at their upper and lower ends, the pivotal axes of said upper and lower hinges being in vertical alinement and disposed adjacent to and substantially parallel to the adjacent front corners of the posts.

19. In a furniture construction of the class described, a merchandised holding unit comprising, a base having horizontal top and vertical ends, front and rear corner posts connected to each end of said base adjacent each corner thereof, said front posts each having a vertical opening at its upper end, a horizontal top, channel bars connected underneath and one at each end of the top, angle brackets secured one at each end of each channel bar and having a downwardly extending arm, said posts and arms having openings therethrough in conjunction with each other when said arms are in place in the posts, and retaining means insertable through said openings for securing the top in place.

20. A construction as defined in claim 19, vertical end panels between the posts at each end of the base, a vertical back between the rear posts, means for releasably securing the back in place to said posts, a horizontal cornice between the ends of front posts, means for supporting said cornice at its ends from the front posts, said means passing through the openings in the front posts and arms of the brackets located on said cornice below the supporting means for the cornice.

21. In a structure as described, a base having vertical ends, end frames connected to and at the outer sides of the ends of said base, each of said end frames including hollow vertical front and rear posts spaced from each other, a transverse member permanently connecting the posts of an end frame in spaced relation to each other, a detachable top extending over and between the upper ends of said frames, and means insertable in the upper and lower ends of a rear post for hingedly connecting said rear post to the rear post of a like structure positioned at an end thereof.

ANTHONY VANDERVELD.

REFERENCES CITED

The following references are of record in the file of this patent:

UNITED STATES PATENTS

| Number | Name | Date |
|---|---|---|
| 1,251,719 | Wege | Jan. 1, 1918 |
| 1,615,265 | Fleischman | Jan. 25, 1927 |
| 2,115,947 | Ellison | May 3, 1938 |
| 2,208,237 | Williams et al. | July 16, 1940 |
| 2,263,280 | Vanderveld | Nov. 18, 1941 |